US008258206B2

(12) United States Patent
Kanagasabapathy et al.

(10) Patent No.: US 8,258,206 B2
(45) Date of Patent: Sep. 4, 2012

(54) HYDROPHOBIC COATING COMPOSITIONS FOR DRAG REDUCTION

(75) Inventors: Subbareddy Kanagasabapathy, Lexington, KY (US); Richard J. Baumgart, Paris, KY (US); Wen-Chen Su, Lexington, KY (US); Frances E. Lockwood, Georgetown, KY (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 982 days.

(21) Appl. No.: 11/787,214

(22) Filed: Apr. 13, 2007

(65) Prior Publication Data
US 2012/0142814 A1    Jun. 7, 2012

Related U.S. Application Data

(60) Provisional application No. 60/791,853, filed on Apr. 13, 2006, provisional application No. 60/763,294, filed on Jan. 30, 2006, provisional application No. 60/841,720, filed on Aug. 31, 2006.

(51) Int. Cl.
C09K 3/00    (2006.01)
(52) U.S. Cl. ....................................................... 523/175
(58) Field of Classification Search ................... 523/175
See application file for complete search history.

(56) References Cited

U.S. PATENT DOCUMENTS

| | | | |
|---|---|---|---|
| 3,354,022 A | 11/1967 | Dettre et al. |
| 4,900,774 A | 2/1990 | Mitsuji et al. |
| 5,130,167 A | 7/1992 | Mitsuji et al. |
| 5,141,915 A | 8/1992 | Roenigk et al. |
| 5,212,241 A | 5/1993 | Woo et al. |
| 5,269,958 A | 12/1993 | de Jager |
| 5,432,000 A | 7/1995 | Young, Sr. et al. |
| 5,520,956 A | 5/1996 | Kieser et al. |
| 5,576,360 A | 11/1996 | Craun et al. |
| 5,599,489 A | 2/1997 | Saiki et al. |
| 5,633,314 A | 5/1997 | Jamasbi |
| 5,705,558 A | 1/1998 | Krouse |
| 6,020,419 A | 2/2000 | Bock et al. |
| 6,150,318 A | 11/2000 | Silvester et al. |
| 6,599,973 B1 | 7/2003 | Visscher et al. |
| 6,660,363 B1 | 12/2003 | Barthlott |
| 6,683,126 B2 | 1/2004 | Keller et al. |
| 6,800,354 B2 | 10/2004 | Baumann et al. |
| 6,811,856 B2 | 11/2004 | Nun et al. |
| 6,822,040 B2 | 11/2004 | Baugh et al. |
| 6,846,512 B2 | 1/2005 | Rohrbaugh et al. |
| 6,852,389 B2 | 2/2005 | Nun et al. |
| 6,858,284 B2 | 2/2005 | Nun et al. |
| 6,977,094 B2 | 12/2005 | Oles et al. |
| 7,066,998 B2 | 6/2006 | Rohrbaugh et al. |
| 7,094,741 B2 | 8/2006 | Barnabas et al. |
| 7,183,354 B2 | 2/2007 | Halladay et al. |
| 7,196,043 B2 | 3/2007 | Valpey, III |
| 2001/0037876 A1 | 11/2001 | Oost et al. |
| 2002/0016433 A1 | 2/2002 | Keller et al. |
| 2002/0045010 A1 | 4/2002 | Rohrbaugh et al. |
| 2002/0150723 A1 | 10/2002 | Oles et al. |
| 2002/0150724 A1 | 10/2002 | Nun et al. |
| 2002/0150725 A1 | 10/2002 | Nun et al. |
| 2002/0150726 A1 | 10/2002 | Nun et al. |
| 2003/0068486 A1 | 4/2003 | Arney et al. |
| 2003/0114571 A1 | 6/2003 | Pan |
| 2004/0047997 A1 | 3/2004 | Keller et al. |
| 2004/0127393 A1 | 7/2004 | Valpey, III |
| 2004/0154106 A1 | 8/2004 | Oles et al. |
| 2004/0213904 A1 | 10/2004 | Muller et al. |
| 2005/0065242 A1 | 3/2005 | McGee et al. |
| 2005/0103457 A1 | 5/2005 | Nun et al. |
| 2005/0118433 A1 | 6/2005 | Oles et al. |
| 2005/0136217 A1 | 6/2005 | Barthlott et al. |
| 2005/0205830 A1 | 9/2005 | Oles et al. |

(Continued)

FOREIGN PATENT DOCUMENTS
CH    268258    8/1950
(Continued)

OTHER PUBLICATIONS

International Searching Authority, International Search Report and Written Opinion, International Application No. PCT/US08/06443, mailed Nov. 19, 2008, 7 pp.

(Continued)

*Primary Examiner* — Edward Cain
(74) *Attorney, Agent, or Firm* — Wood, Herron & Evans, LLP (57) ABSTRACT

A hydrophobic coating has been made for use on interior pipe surfaces, exterior boat surfaces, and in many other applications, to reduce drag in fluid flow, thus providing an energy savings. The coating utilizes a blend of organic and/or inorganic polymers with hydrophobic nanoparticles of fumed silica and/or titania in a solvent. The coating solves the problem of poor resistance to UV light and/or abrasion found in previous coatings of similar nature. The coating of the present invention can be made to be translucent and nearly transparent whereas previous coatings of comparable hydrophobicity have all been white or opaque. The coating can be applied in a single application by an easy spraying method and the super hydrophobic property can be achieved by drying the film at room temperature for 5 to 10 minutes. A preferred coating has good resistance to UV light and some resistance to abrasion. The hydrophobic drag reduction coating composition forms an almost clear, translucent film or coating on painted material, plastic, metal, glass, ceramic, fiberglass or polymer substrate. A preferred coating composition comprising an effective amount of a treated fumed silica in a solvent resulting in a coated surface providing a contact angle of at least 165 degrees as compared to water having a contact angle of from 10 to 15 degrees on a noncoated surface. The composition imparts a degree of hydrophobicity to a surface so that the surface will have a tilt angle of sliding of less than 2 degrees as compared to water on a noncoated surface having a tilt angle of sliding of 90 degrees or higher.

5 Claims, 4 Drawing Sheets

U.S. PATENT DOCUMENTS

| | | |
|---|---|---|
| 2005/0208269 A1 | 9/2005 | Nun et al. |
| 2005/0221107 A1 | 10/2005 | Miyai et al. |
| 2005/0267256 A1 | 12/2005 | Nakamoto |
| 2005/0282953 A1 | 12/2005 | Simendinger, III et al. |
| 2006/0110541 A1 | 5/2006 | Russell et al. |
| 2006/0110542 A1 | 5/2006 | Dietz et al. |
| 2006/0178463 A1 | 8/2006 | Sacks |
| 2007/0027232 A1 | 2/2007 | Walsh, Jr. et al. |

FOREIGN PATENT DOCUMENTS

| | | |
|---|---|---|
| DE | 1 022 246 | 1/1958 |
| DE | 199 17 367 A1 | 10/2000 |
| EP | 0 217 385 A2 | 4/1987 |
| EP | 0 369 581 A1 | 5/1990 |
| EP | 1 040 874 A2 | 2/2000 |
| EP | 1 479 738 A1 | 11/2004 |
| FR | 2150474 | 8/1972 |
| GB | 1 335 957 | 10/1973 |
| GB | 2 223 761 A | 4/1990 |
| GB | 2 231 876 | 11/1990 |
| GB | 2 311 527 A | 2/2000 |
| GB | 2 421 727 A1 | 7/2006 |
| WO | WO 94/04123 | 3/1994 |
| WO | WO 99/36481 | 7/1999 |
| WO | WO 00/39239 | 7/2000 |
| WO | WO 00/58410 | 10/2000 |
| WO | WO 00/71834 | 11/2000 |
| WO | WO 01/96511 | 12/2001 |
| WO | WO 03/22935 | 3/2003 |
| WO | 2007128636 A2 | 11/2007 |

OTHER PUBLICATIONS

Pilotek et al, "Wettability of Microstructured Hydrophobic Sol-Gel Coatings," Journal of Sol-Gel Science and Technology, vol. 26, Jan. 2003, pp. 789-792.

U.S. Patent and Trademark Office, Office Action in related U.S. Appl. No. 11/699,883, dated Nov. 17, 2008, 8 pp.

U.S. Patent and Trademark Office, Office Action in related U.S. Appl. No. 12/011,566 dated Nov. 18, 2008, 8 pp.

International Search Report and Written Opinion of the International Searching Authority, International Application No. PCT/US08/75353, Mailed Nov. 5, 2008, 14 pp.

HYDROPHOBIC COATING COMPOSITIONS FOR DRAG REDUCTION

RELATED APPLICATIONS

This application claims priority from U.S. Provisional Application Ser. No. 60/791,853 filed on Apr. 13, 2006 and U.S. application Ser. No. 11/699,883 filed on Jan. 30, 2007 claiming priority from Provisional Application Ser. No. 60/763,294 filed on Jan. 30, 2006 and U.S. Provisional Application Ser. No. 60/841,720 filed on Aug. 31, 2006 all of which are incorporated by reference herein in their entirety. Reference to documents made in the specification is intended to result in such patents or literature cited are expressly incorporated herein by reference, including any patents or other literature references cited within such documents as if fully set forth in this specification.

BACKGROUND OF THE INVENTION

1. Technical Field

The technical field of this invention is reduction of drag in fluid flows by coating surfaces with super hydrophobic materials.

2. Description of the Prior Art

Drag reduction during flow in conduits, for example of petroleum in pipelines, is an important economic goal with considerable business activity. For example, U.S. Pat. No. 6,162,773 by Eaton et al which issued Dec. 19, 2000 is one of many patents aimed at synthesizing high molecular weight polymers, usually polyalphaolefins, polyalkanes, fluorinated urethanes, etc. These polymers mix in the hydrocarbon fluid and adsorb energy during turbulent flow, reducing drag. Similar principles have been used to create drag reducing agents for water, e.g. U.S. Pat. No. 4,585,810 by Bock et al. which issued Apr. 29, 1986. In this patent a water soluble high molecular weight polymer is added to water to increase pumping rate of firehoses, sewer systems, etc. The subject of this patent is likewise reduction of energy during flow, for aqueous liquids, water and water-loving, hydrophilic, liquids, for example during pumping for irrigation, or water flow around boat hulls, pumping in various industrial processes, and filling of tight annulus during industrial processes such as making liquid crystal displays, filtration, etc. The method of drag reduction, however, is entirely different than in the drag reduction applications using polymers aforementioned. In the art of this patent a super hydrophobic coating is created on the interior conduit surface or the interior of the tight space or annulus or surface of a boat hull. The potential for drag reduction by super hydrophobic surfaces has been recognized and proven in the technical literature, e.g., Watanabe, et. al. (1996) found a 14% drag reduction in laminar flow in a pipe using a highly water-repellent coating of fluorine alkane modified acrylic resin with added hydrophobic silica. This coating had a contact angle with the wall surface of 150 degrees The coating reduces the contact area of liquid wetting drastically, thereby reducing friction and damping turbulent eddies.

U.S. Patent Application 20050061221 by Paszkowski published on Mar. 24, 2005 describes a fractal coating with geometry to cause super hydrophobicity. However a process for producing such a coating on a pipe wall or other object is not given. U.S. Patent Application 20050008495 by Wobben was published on Jan. 13, 2005 has the objective of reducing noise from wind turbine blades by forming a fluid (air)-repellent layer or surface on the wind turbine blades. The application claims the use of nanonails wherein the nanonails comprise hydrophobic polymers attached to the surface. These two patent applications teach that fluid drag can be reduced by hydrophobic coatings but does not provide a practical way to produce such coatings. On the other hand, the coating used by Watanabe is a practical coating, however, its hydrophobicity can be improved and longevity and other performance characteristics improved.

Figure 1:
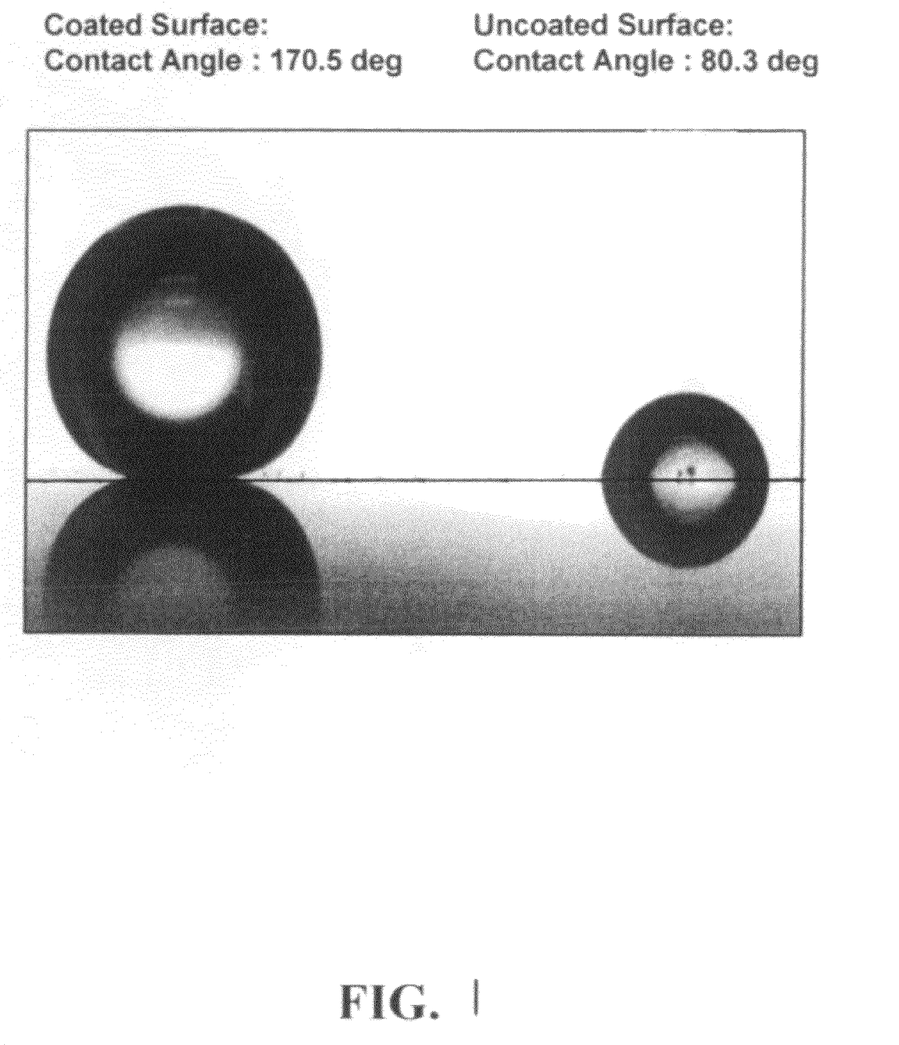
FIG. 1 shows the contact angle of a drop on a surface treated with the coating composition of the present invention as compared to an uncoated surface.
Figure 2:
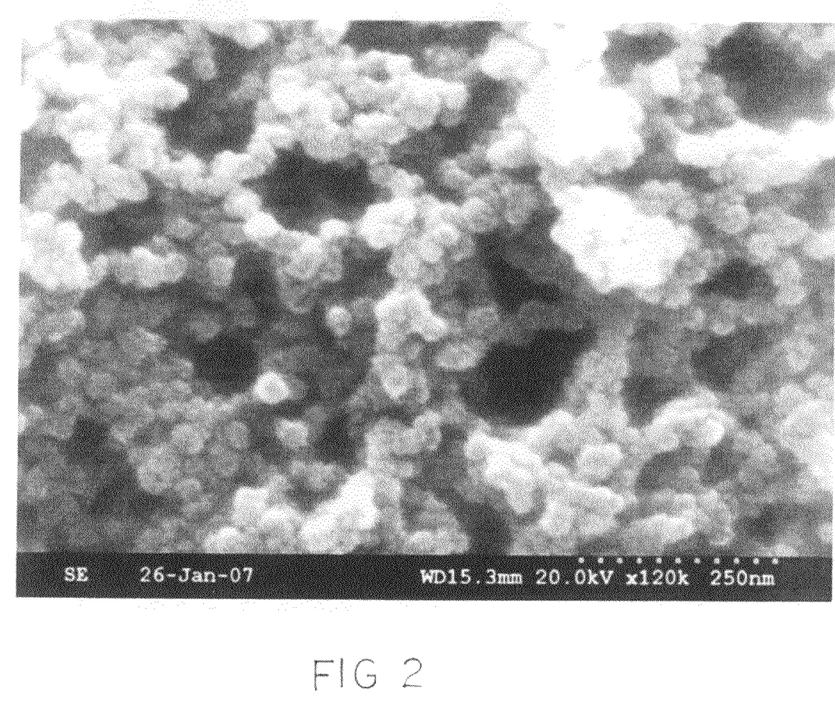
FIG. 2 shows a microphotograph of fumed silica.
Figure 3:
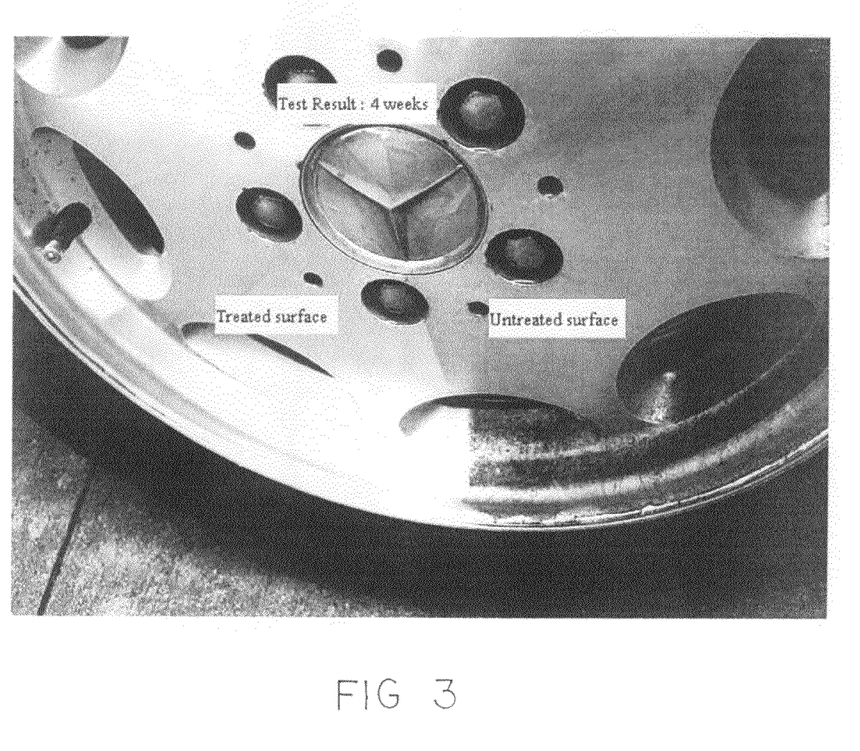
FIG. 3 shows a wheel having a portion of the surface treated with the coating composition of the present invention as being substantially clean as compared with a portion of the surface shown not treated illustrating dust and road grime sticking to the untreated portion of the wheel.
Figure 4:
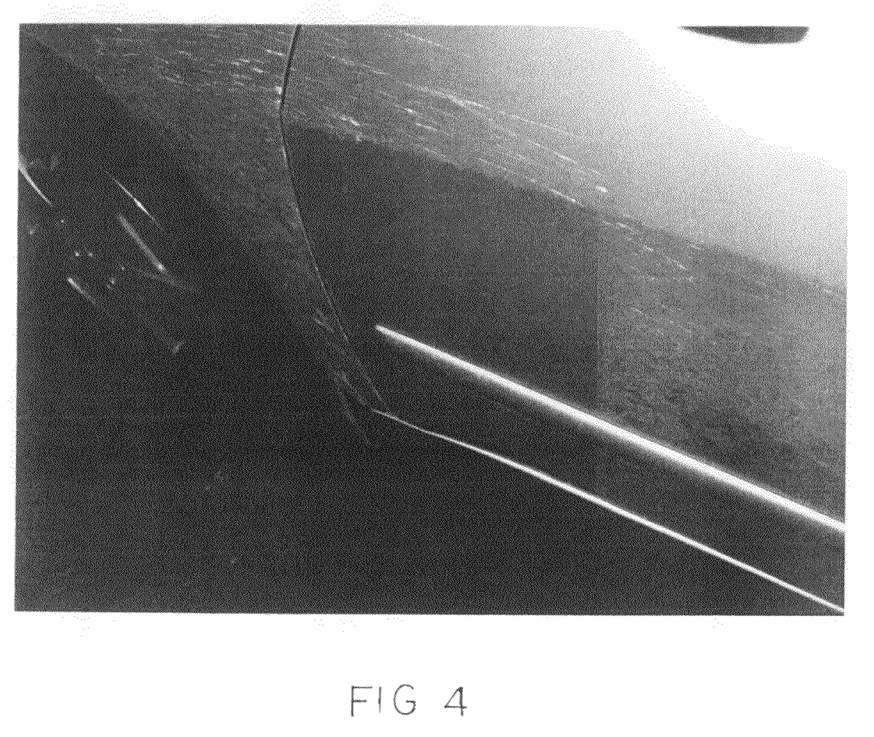
FIG. 4 shows body side panel having a portion of the surface treated with the coating composition of the present invention as being substantially clean as compared with a portion of the surface shown not treated illustrating dust and road grime sticking to the untreated portion of the body side panel.

Super hydrophobic coatings of this type have recently been cited for the purpose of keeping surfaces cleaner, similar to the lotus plant, and the high contact angle is known as the "lotus effect". However, the only materials so far commercialized to produce this cleaning effect, e.g. MINCOR from BASF, and or TEGOTOP from Degussa, have been tested by us and have been found to be unsuitable. When coated alone or mixed with various types of hydrophobic particles, these and many other polymers, e.g. acrylic resins, silicon containing graft copolymers, functional/non functional siloxanes, inorganic hybrids such as silsesquioxanes, acrylic polymers containing perfluoro pendant groups, TEFLON/NAFION type fluoro polymers, urethanes, fluorourethanes, polyethers, polyesters and silicon modified polyacrylates, it is found that the resulting coating is initially super hydrophobic and may remain so for long periods indoors. However, when exposed to outdoor UV light, rubbed even slightly, or in general exposed to weather, the coating loses super hydrophobicity (which we define as the instant shedding of water with no remaining drops) and becomes less hydrophobic within days or even hydrophilic and hence less useful for the object of this invention. Examination under the microscope after a week of exposure on a panel in a UV cabinet reveals that a coating made from fumed silica and at least one film forming binder as per U.S. Pat. No. 6,683,126 by Keller et al. issued in Jan. 27, 2004 is disintegrating as set forth in FIG. 1 wherein the polymers were selected from the class that have hydrophobicity such that the contact angle of the binders were above 90 degrees. (U.S. Pat. No. 6,683,126). Furthermore it has been published (GM reference) that lotus type coatings, when exposed to steam, lose their hydrophobicity. We have found that the state of the art is that no practical lotus coatings exist for the object of this invention.

Another important object of making a practical, UV stable coating is drag reduction for the skin of airplanes, and the blades of wind turbines. The super hydrophobic coating will also have a beneficial effect of reducing turbulent noise in these applications. For example, U.S. Patent Application 20050008495 by Wobben published on Jan. 13, 2005 claims coating a fluid repellent structure such as a shark skin structure with ribs or nanonails would reduce the is energy of air eddies and hence reduce noise. A drag reduction tape is made by 3M (RIBLET TAPE) for this purpose. Also micro-silicone paint (LOTUSAN) is mentioned for reducing icing.

U.S. Patent publication 20060110542 published on May 25, 2006 discloses a composition for forming a detachable and renewable protective coating produced by making a highly concentrated dispersion of hydrophobically modified silica particles in the presence of a disilazane derivative under high shear conditions.

SUMMARY OF THE INVENTION

The coating composition of the present invention can be conveniently applied as an aerosol. If propellant is used it will generally be in an amount from about 10 wt % to about 100 wt % of the aerosol formulation. Normally, the amount of a particular propellant should provide an internal pressure of from about 40 to 100 p.s.i.g. at 70° F. The suspended treated silica generally will be in an amount from about 0.1 wt % to about 10 wt % of the aerosol formulation. To make the silica coating easier to apply it can be dispersed in solvents. The solvent composition can be in the range of 0 wt % to 60 wt %.

The present invention described herein provides a long lasting super hydrophobic coating that has the benefit of reducing drag, noise, and will reduce icing caused by water drops. However it should be noted that snow will cover horizontal surfaces but can be more easily removed from the surfaces protected with the invented coatings. Furthermore, the invented coatings are inexpensive compared to paint and can be sprayed regularly if necessary to help prevent icing.

The present invention relates to a process and composition for creating super hydrophobic coatings (contact angle >165 degree) on various surfaces, preferably plastics, metals, glass, ceramics, wood, and painted and/or waxed surfaces. Super hydrophobic coatings of this type have recently been cited as means for preparing drag reduction and self cleaning surfaces and resisting penetration of liquids incorporating nano particle size irregularities on a surface exhibited by the lotus plant due to forming surfaces having high contact angle, a phenomenon known as the “lotus effect”. Examples of commercially available materials which attempt to produce this “Lotus” effect are products sold under the trade name of MINCOR available from BASF, and TEGTOP available from Degussa. These products, have been tested for their ability to protect various surfaces from the appearance of water marks, corrosion, dirt repellency, and drag reduction while maintaining the water repellency, but have been deemed unsuitable. When coated alone or mixed with various types of hydrophobic particles, these and many other polymers, e.g. acrylic resins, silicon containing graft copolymers, functional/non functional siloxanes, inorganic hybrids such as silsesquioxanes, acrylic polymers containing perfluoro pendant groups, polytetrafluoroethylene, nafion type fluoro polymers, urethanes, fluorourethanes, polyethers, polyesters and silicon modified polyacrylates, it was found that the resulting coating is initially super hydrophobic and may remain so for long periods indoors; however, when exposed to outdoor UV light, rubbed even slightly, or in general exposed to weather, the coating loses super hydrophobicity (which we define as the instant shedding of water with no remaining drops) and becomes less hydrophobic within days or even hydrophilic and hence less useful for the object of the present invention. Examination under the microscope after a week of exposure on a panel in a UV cabinet reveals that a coating made from fumed silica and at least one film forming binder as taught in U.S. Pat. No. 6,683,126 disintegrates. None of the conventional hydrophobic compositions known provide a long lasting super hydrophobic coating that has the benefit of drag reduction upon exposure to gas, liquid, or solid fluid flow over various surfaces. The coatings of the instant invention are inexpensive compared to paint and can be sprayed regularly if necessary to reduce drag without any further steps.

The static contact angle of a drop of liquid can be used to measure the wet ability of surfaces. The static contact angle, (“contact angle”), can be defined as the angle enclosed by the surface and a tangent along the surface of the liquid drop in the region of the contact point of the liquid drop with the surface. The contact angle is measured through the liquid drop. A contact angle of 0 defines complete wettability and does not form a drop. A contact angle of 180 degrees defines complete unwettability.

The hydrophobic drag reduction and self-cleaning properties of the coating composition of the present invention forms an almost clear, transparent dirt repellant film or coating on painted material, plastic, metal, glass, ceramic, fiberglass or polymer substrate. A preferred coating composition comprising an effective amount of a treated fumed silica in a selected solvent applied to a surface resulted in a coated surface providing a contact angle of at least 165 degrees as compared to water having a contact angle of from 10 to 15 degrees on a noncoated surface. The composition also imparted a degree of hydrophobicity to the treated surface resulting in a tilt angle of sliding of less than 2 degrees as compared to water on a noncoated surface having a tilt angle of sliding of 90 degrees or higher.

In the instant invention, compositions are provided having a small amount of nanoparticles of fumed silica and/or titania, or other hydrophobic nanoparticle component with good UV light stability and good adhesion to metals, glass, plastic, painted and many other surfaces.

Although a variety of polymers will work if coated with a hydrophobic nanoparticle material, e.g. silsesquioxanes, perfluoroacrylic resins etc. only a few polymers serve as an adequate base for the particles because the surface area of exposed polymer is vastly increased due to very thin film and rough surface area produced by the coating. This problem was either not understood or not solved in the prior art references.

The object of this invention is to provide a super hydrophobic coating, that is so hydrophobic that water will bounce of the surface of nominally horizontal coated plates. In this case the contact angle is so large, (greater than 123 degree in at least one embodiment), that it cannot be measured by conventional instrumentation.

The present invention relates to a process and composition for creating hydrophobic drag reduction coatings having a contact angle of 123 degrees of greater on various surfaces, preferably plastics, metals, glass, ceramics, and painted and/or waxed surfaces.

The present invention relates to at least one embodiment of a process and a composition for creating hydrophobic drag reduction coatings having a contact angle of ast least 165 degrees on various surfaces, preferably plastics, metals, glass, ceramics, and painted and/or waxed surfaces.

Another object is to provide coatings that are practical in use, that do not degrade rapidly in sunlight, that can be readily applied, and have enough resistance to abrasion to survive for a practical length of time depending upon the application for a significant amount of time to decrease the drag reduction of a coated surface subjected to gas, liquid, and solid fluid flows and/or combinations thereof as compared to uncoated surfaces even with environmental exposure in the application of use.

Another object is to provide a process for applying a drag reducing and self cleaning coating containing hygroscopic nanoparticles without the use of adhesives or by pre-treating the surface of the substrate to be coated with an adhesive.

It is another object of the present invention to provide a drag reduction and self cleaning coating composition containing hygroscopic nanoparticles that cures by evaporation of the solvent and does not require any special treatment such as heat, IR or UV light, or crosslinking to cure.

In the instant invention polymer resins with UV light stability and good adhesion to metals, glass, plastic, painted and many other surfaces, are combined with hydrophobic binders such as silicone or fluorine containing polymers etc. Organic polymers or inorganic polymers or a combination thereof are blended with a small amount of hydrophobic nanoparticles of fumed silica and/or titania in a solvent so that the coating imparts sufficient surface roughness for super hydrophobicity. The polymer and nanoparticles can be applied by brush, dipping, or spraying in a broad range of solid mixtures using VOC complaint solvents and can be applied using an aerosol propellent. The final uniform coating can be obtained by drying the film at room temperature for 5 to 10 minutes.

The invention described herein provides a long lasting super hydrophobic coating that has the benefit of reducing drag upon application to various surfaces.

The hydrophobic drag reducing coating composition forms an almost clear, translucent film or coating on painted material, plastic, metal, glass, ceramic, fiberglass or polymer substrate. A preferred coating composition comprising an effective amount of a treated fumed silica in a solvent will result in a coated surface providing a contact angle of at least 123 degrees as compared to water having a contact angle of from 10 to 15 degrees on a noncoated surface. Said composition imparts a degree of hydrophobicity to a surface so that the surface will have a tilt angle of sliding of less than 2 degrees as compared to water on a noncoated surface having a tilt angle of sliding of 90 degrees or higher.

It is an object of the present invention to provide a super hydrophobic coating, which is so hydrophobic that water will bounce off the surface of nominally horizontal coated plates. In this case the contact angle is so large (greater than 123 degree) that it can not be measured by conventional instrumentation.

Another object of the present invention is to provide drag reduction coatings that are practical in use, that do not degrade rapidly in sunlight, that can be readily applied, and have enough resistance to abrasion to survive for a practical length of time, preferably for weeks or months depending upon environmental conditions to which the coating is exposed.

It is an object of the present invention to apply the hydrophobic nanoparticle containing composition by conventional methods of application such as by spraying, It is an object of the present invention to provide a hydrophobic drag reducing composition which upon application to a surface forms a uniform coating by drying and evaporation of the solvent forming a coating or film at ambient temperature within 5 to 10 minutes.

Accordingly, it is an object of the present invention to provide a clear, translucent, pigmented, florescent, dyed, tinted, or illuminative hydrophobic drag reducing coating for application to a metal, plastic, glass, cloth, ceramic, clay, fiber, concrete, brick, rock, cinder block, paper, film, or wood surface.

It is an object of the present invention to be applicable in a pressurized container, tube, aerosol, or spray bottle.

It is an object of the present invention to provide a drag reducing coating which can be removably placed upon a solid substrate such as paints, metals, plastics, concrete, natural and synthetic elastomers, and ceramics and removed by washing or applying pressure to the coating wiping same from the treated surface.

It is an object of the present invention to provide a water based or solvent based carrier for the drag reducing hydrophobic coating for use on metal, plastic, glass, paper, or wood surfaces having existing protective coatings of paint, varnish, film, without damaging the existing protective coatings.

It is another object of the present invention to produce a peelable coating which does not damage the surface.

It is yet another object of the present invention to produce a protective coating which will not damage paint, chrome, plastic, fiberglass, or other substrate to be coated therewith.

It is another object of the present invention to produce a drag reducing hydrophobic coating which is easily to apply as a liquid, foam, jell, paste, semi-solid, or aerosol.

It is another object of the drag reducing hydrophobic coating embodiment to be applied to surfaces without complicated apparatus.

It is yet another object of the drag reducing hydrophobic coating to cure by evaporation of a selected solvent at ambient temperature and not requiring a cross-linking curing agent.

It is an object of the present invention to provide a drag reducing hydrophobic coating which can be applied by brush, roll, spray, or dipping onto dry surfaces.

The foregoing objects are accomplished by selecting hydrophobic nanoparticles which enables the formulation of a composition which will produce a practical self cleaning coating that is not easily destroyed by fog, UV light, abrasion, or by flowing water.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

The present invention provides a coating composition which is super hydrophobic, and when applied on a surface, typically metal, fiberglass, plastic, ceramic, glass, painted material, etc. produces a difficult to wet surface. Contact angles of a liquid such as water on the coated surface should be difficult to measure with conventional means because the water droplet bounces or runs off the surface when applied. The contact angle exceeds 123 degrees and the tilt angle of sliding is less than 2 degrees.

The coatings in the examples are optimized formulations that contain super hydrophobic nanoparticles, for example, fumed silica and/or titania. Although a variety of nanoparticles will work if treated with a hydrophobic material, e.g. silsesquioxanes, perfluoroacrylic resins etc. only few polymers serve as an adequate base for the particles because the surface area of exposed polymer is vastly increased due to very thin film and rough surface area produced by the coating.

The present invention provides a formulation which can utilize nanoparticles in the composition without any binder to produce a practical lotus effect that is not easily destroyed by fog, UV light, or abrasion, or by flowing water.

This transparent, uniform film is stable when exposed outdoors to strong UV light, rain, wind, etc. for a minimum time of one month, compared to 3 days for most other polymers including acrylates, urethane acrylates, homopolymers and copolymers of ethylenically unsaturated monomers, acrylic acid/maleic anhydride copolymers etc. Stability is determined by observing that the super hydrophobic effect has not diminished and by examining the film under the microscope before and after exposure.

Nanoparticles that can be used to make the coatings of this invention are generally from the class of fumed silica's and hydrophobic titania's and zinc oxides, e.g. DEGUSSA AEROSIL R8200, DEGUSSA AEROSIL 812 S, and CAB-O-SIL TS 530, TS 610, TS 720. The particle size of the nanoparticles are from about 7 to 100 nanometers. To make the silica coating easier to apply it can be dispersed in solvents, preferably acetone and or aliphatic hydrocarbons and/or other VOC complaint solvents to make it sprayable. The solvent may also be selected from the groups consisting of an alcohol, a hydrocarbon, mineral spirits, or water. A preferred method of application is by spraying the solvent/particle dispersion as an aerosol. Suitable propellants are carbon dioxide, a hydrocarbon (for example mixtures of propane, butane and isobutane), a fluorocarbon, difloroethane, or compressed air. One preferred hydrocarbon is a propane/isobutane.

Although a variety of polymers will work if coated with a hydrophobic nanoparticle material, e.g. silsesquioxanes, perfluoroacrylic resins etc. only a few polymers serve as an adequate base for the particles because the surface area of exposed polymer is vastly increased due to very thin film and rough surface area produced by the coating. This problem was either not understood or not solved in the prior art references. Formulation of the coating to resist abrasion and the elements, particularly UV light is an object of this invention. UV stability of the super hydrophobic coatings is extremely important especially for exterior surfaces which are exposed to UV light.

UV stability is important for drag reduction of boats, wind turbine blades, airplane wings, etc., all of which are exposed to UV light. The majority of the potential binders are not stable in the lotus type coating and only careful selection of the binder and/or formulation with stabilizing additives will produce a practical lotus effect that is not easily destroyed by fog, UV light, or abrasion, e.g. by flowing water. Furthermore the polymers must be selected from the class that have hydrophobicity such that the contact angle of water on the polymer surface alone exceeds 123 degrees.

A preferred class of UV stable hydrophobic polymers are the trimethylsilyl end capped siloxanes, e.g. Wacker Polymer NA. These polymers can be combined with 0.1 to 5% of hydrophobic fumed silicas such as DeGussa Aerosil R8200 and coated as diluted in 95% solvent, preferably acetone, to form a super hydrophobic coating. This transparent, more uniform film is stable when exposed outdoors to strong UV light, rain, wind, etc. for a minimum time of one month, compared to 3 days for most other polymers including acrylates, urethane acrylates, homopolymers and copolymers of ethylenically unsaturated monomers, acrylic acid/maleic anhydride copolymers etc.

Other polymer classes such as acrylates can be improved in UV stability by adding up to 0.05% of zinc oxide nanoparticles, e.g. ZnO from Nanotechnology Inc. For example, the formula 052-A without ZnO had a UV stability of less than 64 hrs in the UV cabinet (0.68 W/m$^2$ at 340 nm, 55° C.). When 0.003% nano zinc oxide was added, UV stability was improved to 31 days. Stability is determined by observing that the super hydrophobic effect has not diminished and by examining the film under the microscope before and after exposure. Polymers known to improve the UV stability with ZnO are hydroxy-functional silicone modified polyacrylates, polycarboxylates, polyethers, polyvinylacetates. Other polymers that failed to show good UV stability include amino functional siloxanes.

Another preferred class of UV and abrasion resistant hydrophobic polymers are the perfluoro alkyl substituted acrylic polymers. This class of polymers has excellent hydrophobicity and good abrasion resistance.

A more detailed description of some of the ingredients utilized in the preferred embodiments of the drag reduction hydrophobic compositions are as follows:

Hydrophobic Surface Modifier

The coatings in the examples are optimized formulations that contain super hydrophobic nanoparticles. Although a variety of nanoparticles will work if coated with a hydrophobic material, e.g. fumed silica and/or titania, perfluoroacrylic resins etc. only few polymers serve as an adequate base for the particles because the surface area of exposed polymer is vastly increased due to very thin film and rough surface area produced by the coating.

It is believed the instant composition is a novel combination of synergistic components even without the addition of a hydrophobic fumed silica; however, a preferred embodiment of the present invention contains hydrophobic fumed silica in an effective amount of up to 1.5 percent by weight of the total composition. The more preferred embodiments of the invention utilizes an effective amount of ranging from 0.001 to 2.0 percent by weight, and more preferably in a range of from to 0.01 to 1.5 percent by weight, and more preferably in a range of from between 0.1 to 1.0 percent by weight, and more preferably between 0.1 to 0.5 percent by weight based on the total weight of the composition. One preferred embodiment as set forth in Example 1, uses nanoparticles of modified silica particles in an amount of about 0.25 percent by weight based on the total weight of the composition.

Suitable hydrophobically modified fumed silica particles that may be used in the present invention include silica particles that have been hydrophobicized by any means known in the art. Nanoparticles that can be used to make the coatings of this invention are generally from the class of fumed silicas and hydrophobic titanias and zinc oxides, e.g. Degussa AREOSIL R8200, Degussa AEROSIL 812 S, Cab-o-sil TS 530, TS 610, TS 720.

The composition of the present invention contains a hydrophobic fumed silica such as sold under the trade name of AEROXIDE LE3 to generate self cleaning nanostructured hydrophobic surfaces which repel water. The average particle size distribution of particles is believed to be between 100 to 4,000 nanometers. The LE 3 brand has a specific surface area (BET) of 100+−30 m$^2$g, a carbon content of 3 to 6 weight percent, tapped density of approximately 60 g/l (According to (DIN EN ISO 787/11, August 1983), and a moisture of less than or equal to 1.0 weight percent (2 hours at 105° C.).

Several types of hydrophobically modified fumed silica is set forth in U.S. Patent Publication No. US 2006/0110542 by Dietz et al. Published on May 25, 2006 which is incorporated by reference herein and are described as follows:

Colloidal silicon dioxide is a generally fumed silica prepared by a suitable process to reduce the particle size and modify the surface properties. The surface properties are modified to produce fumed silica by production of the silica material under conditions of a vapor-phase hydrolysis at an elevated temperature with a surface modifying silicon compound, such as silicon dimethyl bichloride. Such products are commercially available from a number of sources, including Cabot Corporation, Tuscola, Ill. (under the trade name CAB-O-SIL) and Degussa, Inc., Piscataway, N.J. (under the trade name AEROSIL).

Suitable hydrophobically modified fumed silica particles include, but are not limited to: those commercially available from Degussa Corporation, Parsippany, N.J., as designated under the R Series of the AEROSIL[R] and AEROXIDE[R] LE trade names. The different AEROSIL[R]R and AEROXIDE[R]LE types differ in the kind of hydrophobic coating, the BET surface area, the average primary particle size and the carbon content. The hydrophobic properties are a result of a suitable hydrophobizing treatment, e.g., treatment with at least one compound from the group of the organosilanes, alkylsilanes, the fluorinated silanes, and/or the disilazanes. Commercially available examples include AEROSIL[R]R. 202, AEROSIL[R]R 805, AEROSIL[R] R 812, AEROSIL[R]R 812 S, AEROSIL[R] R 972, AEROSIL[R]R 974, AEROSIL[R]R 8200, AEROXIDE[R]LE-1 and AEROXIDE[R] LE-2.

Other silica materials are also suitable when hydrophobically modified by use of hydrophobizing materials capable of rendering the surfaces of the silica particles suitably hydrophobic. The suitable hydrophobizing materials include all those common in the art that are compatible for use with the silica materials to render their surfaces suitably hydrophobic. Suitable examples, include, but are not limited to: the organosilanes, alkylsilanes, the fluorinated silanes, and/or the disilazanes. Suitable organosilanes include, but are not limited to: alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane; trialkoxyarylsilanes; isooctyltrimethoxy-silane; N-(3-triethoxysilylpropyl)methoxyethoxyethoxy ethyl carbamate; N-(3-triethoxysilylpropyl)methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Some suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable disilazanes include for example, but are not limited to: hexamethyldisilazane, divinyltetramethyldisilazane and bis(3,3-trifluoropropyl)tetramethyldisilazane. Cyclosilazanes are also suitable, and include, for example, octamethylcyclotetrasilazane. It is noted that the aforementioned disilazanes and cyclosilazanes typically have the basic formula (I) and (II) described above. Thus, these disilazanes and cyclosilazanes can be used as either or both as hydrophobizing material for hydrophobically modifying fumed silica particles and as a processing aid in forming the pre-dispersion mentioned supra.

Suitable fluorinated silanes include the fluorinated alkyl-, alkoxy-, aryl- and/or alkylaryl-silanes, and fully perfluorinated alkyl-, alkoxy-, aryl- and/or alkylaryl-silanes. Examples of fluoroalkyl silanes include, but are not limited to: those marketed by Degussa under the trade name of Dynasylan. An example of a suitable fluorinated alkoxy-silane is perfluorooctyl trimethoxysilane.

Hydrocarbon Solvents

To make the coating easier to apply it can be dissolved in solvents, preferably acetone, alcohol, and/or aliphatic hydrocarbons and/or other VOC complaint solvents to make it sprayable.

Organic solvents useful in the present invention include isoparaffins, aliphatic hydrogen solvents, paraffinic solvents, paraffins, synthetic isoparaffinic solvents. They aid in the control and slow down the evaporation rate of the film formation and aid in leveling of the solids.

Light Hydrocarbon Distillate

The solvent concentration consisting of light distillate hydrocarbons and isoparaffinic hydrocarbons can vary from about 15% to about 85% by weight of the final formulation.

In addition to being a carrier for the film forming ingredients, the hydrocarbon solvent functions both to remove oil based stains as well as to dissolve contaminants previously deposited on the surface preventing buildup. The hydrocarbon solvent should have an appropriate evaporation rate in order to provide adequate contact time to dissolve old solvent based coatings on the surface to be treated, but not so slow as to result in smearing of the deposited film. Moreover, the hydrocarbon solvent aids in cleansing and in the aid of the removal of residual water upon application of the coating composition on a substrate surface being treated.

Light Distillate solvents useful in the formulation are predominately aliphatic hydrocarbon solvents and other light distillates. For instance, hydrocarbons containing up to 100 percent aliphatic hydrocarbons are most preferable and hydrocarbons containing less than 1 percent aromatic content are deemed very desirable. Also useful are solvents typically containing from about 10 to 90 percent aliphatic hydrocarbons and from about 0 to 10 percent aromatic hydrocarbons. Solvents deemed suitable which contain less than 10% aromatic hydrocarbons include odorless mineral spirits, Stoddard solvent, and mixed alkanes that have a flash point of about 40° C. A light distillate sold under the trade name of CALUMET 420-460 (LVP100), can be utilized in the composition.

Light Distillate hydrocarbons containing up to 100 percent aliphatic hydrocarbons are most preferable and hydrocarbons containing less than 1 percent aromatic content are deemed very desirable. Also useful are solvents typically containing from about 10 to 90 percent aliphatic hydrocarbons and from about 0 to 10 percent aromatic hydrocarbons. Solvents deemed suitable which contain less than 10% aromatic hydrocarbons include odorless naphtha mineral spirits, turpentine, kerosene, V.M.& P, naphtha, Stoddard solvent, and mixed alkanes that have a flash point of about 40° C.

The present invention contains light distillate hydrocarbons in an effective amount of between 15 to 75 percent by weight, more preferably between 20 to 45 percent by weight, and more preferably 25 to 35 percent by weight based on the weight of the total composition.

Isoparaffinic Hydrocarbon High Boiling Organic Solvent

A synthetic isoparaffinic hydrocarbons such as ISOPAR G, ISOPAR M, ISOPAR E, CONOSOL 200, LPA 210, LVP 200 are also useful isoparaffinic hydrocarbon solvents in the present invention.

In addition to the aliphatic hydrocarbon distillate, a preferred embodiment utilizes an isoparaffinic organic solvent added to the composition to aid in cleansing and aid in the removal of residual water upon application of the product on a surface.

Preferred organic solvents are sold under the trade name of ISOPAR which are synthetically produced isoparaffinic solvent sold by ExxonMobil Chemical Company which exhibit a low surface tension and also aid in the spreadability of soluble components. The isoparaffinic solvents are highly aliphatic compounds containing a high percentage of isoparaffins. The organic solvents used in the present invention are typically considered high boiling solvents having a low vapor pressure typically less than 1.0 mm Hg at 20° C. and preferably 0.1 mm Hg or less at 20° C. Furthermore, the most preferred ISOPAR solvents reportedly have a vapor pressure of about 10 mm Hg at 38° C. and more preferably have a vapor pressure of about 4 mm Hg at 38° C. The evaporation rate is an important criteria in selection of the organic solvent.

For instance, a preferred ISOPAR solvent is ISOPAR G which has a distillation range for IBP of 163 and DP of f176, a flash point of 41° C. and evaporation rate of 21 at (N-BuAc=100).

It is also anticipated that white spirits, such as are produced by SHELLSOL (Shell Co. And EXXSOL produced by ExxonMobil Corporation can also be utilized as the solvent.

A preferred embodiment utilizes ISOPAR G as a high boiling organic hydrocarbon solvent from ExxonMobil in an effective amount of from of between 15 to 75 percent by weight, more preferably between 30 to 55 percent by weight, and more preferably 35 to 50 percent by weight based on the weight of the total composition.

UV Protection (Zinc Oxide)

A conventional zinc oxide can be used in the instant formulation to provide UV protection to the instant composition; however, a preferred embodiment of the present invention utilizes a micro fine transparent nanometer sized zinc oxide powder which offers exceptional and along lasting broad spectrum UV-B/UV-A protection. It is highly effective to protect transparent plastics and plastic films from harmful ultraviolet radiation. Its homogeneous small particles and narrow particle size distribution provides for excellent transparency. It is non-migratory and has antibacterial properties.

Regular commercially available zinc oxides have specific surface areas below 10 $m^2$/gr, (typically 4-6 $m^2$/gr), resulting in high primary particle sizes which results in white particle in appearance. The mean particle diameter of the zinc oxide is about 35 nanometers and the majority of the particles range from about 20 to 35 nanometers. One source of the nanometer sized zinc oxide, (ZANO 20) is Umicore Zinc Chemicals in Belguim. One preferred embodiment utilizes zinc oxide particles having a specific surface area of minimum 20 $m^2$/gr, resulting in very fine loosely aggregated particles having a primary particle size below 60 nanometer providing a narrow particle size distribution allowing the zinc oxide to be used in transparent applications. Additional zinc oxide products available from Umicore Zinc Chemicals suitable for use in the present invention is sold under the tradename of ZANO LS and has a specific surface are of 20-30 $m^2$/gr and a primary particle size (calculated) of about 35-55 nanometers; and ZANO HS which has a specific surface are of 30-40 $m^2$/gr and a primary particle size (calculated) of about 25-35 nanometers. The homogeneous particle size distribution of the nanometer sized particle and its fine primary particle size result in good transparency. The nanometer sized zinc oxide particles are broad spectrum UV absorbers (UV-A and UV-B) which is not the case for micro fine TiO2 and organic UV absorbers. It also has anti-bacterial properties and is mildew resistant.

An alternate embodiment utilizes zinc oxide having an average particle size of 60 nanometers (calculated via SSA measurement) sold under the tradename of NANOGARD by Nanophase Technologies Corporation, in Romeoville, Ill. Although it is sold as a white powder, the nanometer sized particles in low concentrations utilized in the preferred embodiments of the instant invention appear transparent.

The zinc oxide in at least one preferred embodiment of the present invention is present in an effective amount of up to 1.0 percent by weight of the total composition. The more preferred embodiments of the invention utilizes an effective amount of glycerin ranging from 0.001 to 1.0 percent by weight, and more preferably in a range of from to 0.005 to 0.6 percent by weight, and more preferably in a range of from between 0.01 to 0.4 percent by weight, and more preferably between 0.05 to 0.2 percent by weight based on the total weight of the composition.

Propellant:

A preferred method of application is by diluting the solvent an aerosol containing a propellant such as carbon dioxide, a hydrocarbon (for example mixtures of propane isobutane), a fluorocarbon, difloroethane, and compressed air. One preferred hydrocarbon is a propane/isobutane.

In one preferred embodiment, a pressurized liquid propellant is utilized as a carrier to apply the composition. A commercial liquid hydrocarbon propellant can be selected which is compatible with the preferred composition may be selected from the pressured propane/isobutane/butane blends, with the most preferred propellant as 46 psi or 70 psi for use with particular compositions. A commercial liquid hydrocarbon propellant is selected from the group consisting of A-31, A-46, A-55, A-70, or A-108, and/or propane/isobutane/butane blends, with A-46 and A-70 being the most preferred propellant for use with particular compositions. The composition may contain up to 30 weight percent of the propellant, and more preferably from 5 to 20 weight percent of the propellant. Moreover the composition can be formulated as a premix liquid concentrate and mixed with a desired amount of propellant. For example, a typical formula may contain about 88 percent by weight of a premix liquid concentrate and about 12 percent by weight of a selected propellant. As an alternative, a nonfloronated hydrocarbon propellant such as pressurized air, $N_2$, $CO_2$ may also be used.

The composition may contain up to 99.9 weight percent of propellant, and more preferably from 0 to 90 weight percent of propellant and more preferably from about 80 to 90 wt % propellant.

Fragrances

Although not required, an effective amount of one or more fragrances, such as vanilla, bubble gum, orange, fruity bouquet and the like may be added to the instant invention to impart a desirable scent to the product. Preferably the fragrance is present in an amount of up to 2 percent by weight, and more preferably of from between 0.001 to 1.0 percent by weight, and more preferably of from between 0.01 to 0.5 percent by weight.

Dyes

As an option, a dye can be added to the composition to provide a desirable color or tint. Of course, it is contemplated that an effective amount could comprise more or less dye or tint up to 1% of the total weight of the composition.

Other colorants suitable for use in the instant composition include metallized azos such as barium or calcium salts, naphthol, pyrazalones, rhodamines, quinacridones, phthalocyanines, phthalocyanines, pigments including the magnesium salts, lead chromes and silicochromates, zinc chromes, barium chromate, strontium chromate, titanium nickel yellow, liminites, haematites, magnetites, micaceous oxides of iron, iron ferreites and Prussian blue.

Preservatives:

A biocide, such as DANTOGARD (DMDM Hydantoin) or TROYSAN 395 can be optionally used as a preservative in the product. The biocide is not a necessary component to provide a functional composition for use on surfaces; however, depending upon the optional ingredients added to the formulation, the preservative may increase the useful shelf life to the product. The biocide preservative would be added in an effective amount to preserve the composition product and ranges from 0.001 to 2.0 percent by weight, and more preferably in a range of from 0.05 to 1.0 percent by weight, and more preferably in a range of from between 0.1 and 0.5 percent by weight based on the total weight of the composition. Other preservatives is such as polymethoxybicyclic oxazolidine, DANTOGARD, or SURCIDE P may also be useful in the present invention.

Application:

The coating composition of the instant invention can be applied to a substrate surface by spraying, dipping, brushing, or spin-coating the surface being treated.

A preferred method of application is by spraying the solvent/particle dispersion as an aerosol. Suitable propellants are for example hydrocarbon of from 1 to 15 carbon atoms, such as n-propane, n-butane, isobutane, n-pentane, isopentane, and mixtures thereof; dimethyl ether and blend thereof as well as individucal or mixtures of choloro-, chlorofluoro-, and/or fluorohydrocarbons and/or hydrochlorofluorocarbons (HCFCs). Also suitable as propellant as compressed gas such as carbon dioxide, compressed air, nitrogen, and possibly dense or supercritical fluids may also be used, ether alone or combination, and alternatively and combination with other propellant types.

If propellant is used it will generally be in an amount from about 10 wt % to about 100 wt % of the aerosol formulation. Normally, the amount of a particular propellant should provide an internal pressure of from about 40 to 100 p.s.i.g. at 70° F. The suspended treated silica generally will be in an amount from about 0.1 wt % to about 10 wt % of the aerosol formulation. To make the silica coating easier to apply it can be dispersed in solvents. The solvent composition can be in the range of 0 wt % to 60 wt %.

To make the silica coating easier to apply it can be dispersed in at least one solvent preferably acetone and/or aliphatic hydrocarbons and/or other VOC complaint solvents to make it sprayable. The solvent may also be selected from the groups consisting of an alcohol, a hydrocarbon, mineral spirits, or water. The hydrocarbon solvent aids in cleansing and in the aid of the removal of residual water upon application of the product on a surface.

The composition is applied as a substantially clear hydrophobic self-cleaning coating to a metal, plastic, glass, cloth, ceramic, clay, fiber, concrete, brick, rock, cinder block, paper, film, or wood surface. After application of a uniform coating to the treated surface, the composition cures by drying and evaporation of the solvent forming a coating or film at ambient temperature within 5 to 10 minutes of the application.

The transparency and haze of the coating produced was measured by a HAZE GARD PLUS instrument for a composition having a concentration of the silica in diluent of 2000 nm.

| % Treated Fumed Silica | 0.3 | 0.5 | 0.8 | 1.0 | 4.0 |
|---|---|---|---|---|---|
| Transmittance (%) | 93.9 | 93.8 | 94.0 | 93.7 | 93.0 |
| Haze (%) | 2.35 | 3.26 | 3.26 | 3.22 | 4.36 |

Tests show transparency can be achieved in coating compositions containing from 0.01 to 1.0 wt % treated fumed silica. Amounts of greater than 1% result in coatings exhibiting drag reduction, but not transparency.

EXAMPLES

The following examples provide formulations of compositions in accordance with the present invention and provide examples of the range of ingredient percentages by weight providing an effective amount of the particular ingredients deemed necessary to obtain the desired results in a single application. The examples are provided for exemplary purposes to facilitate understanding of the invention and should not be construed to limit the invention to the examples.

Example 1

A typical formulation consisting essentially of 0.5 wt % solid of fumed silica (Aerosil R 8200 from Degussa) in solvent comprising from 10-15 wt % acetone. The final formulation is coated on a painted metal panel using aerosol propellent comprising from 80 to 90 wt % of A-70. The super hydrophobic property was lost in 64 hrs, when the film was exposed to UV light.

Example 2

Another preferred embodiment formulation consisting essentially of 0.5 wt % solid of fumed silica (Aerosil R 8200 from Degussa) in solvent comprising from 10-15 wt % acetone with the remainder comprising mineral spirits. The formulation was similar to the formulation in Example 1 except that example 2 contained 0.1 wt % of a trimethylsilyl end capped siloxane polymer (polymer NA from Wacker Chemie) as a binder was coated by painting on an unpainted metal surface. The film generated by this formulation showed excellent super hydrophobic property (contact angle >165 degree). The super hydrophobic property was maintained for more than one month under UV light, rain etc.

Example 3

Another preferred embodiment comprises a formulation consisting essentially of 0.5 wt % solid of fumed silica (Aerosil R 8200 from Degussa) in solvent comprising from 10-15 wt % acetone and the remainder mineral spirits. The formulation was similar to example 1 except that example 3 contains 0.05% nanoparticles of ZnO as a UV stabilizing material. The coating composition was coated on a painted metal surface by using a trigger sprayer. The film generated by this formulation showed excellent hydrophobic property (contact angle >165 degree). The super hydrophobic property was maintained for more than 4 weeks under UV light, rain, etc.

Example 4

Another preferred embodiment comprises a formulation consisting essentially of 0.5 wt % solid of fumed silica (Aerosil R 8200 from Degussa) in solvent comprising from 10-15 wt % acetone, and the remainder mineral spirits. The formulation was similar to the formulation in Example 1 except that the instant example 4 contains 0.3 wt % of binder polymer (aminofunctional siloxanes from Dow Corning) as a binder. The coating composition was applied to a painted metal surface by dip coating. The film generated by this formulation didn't show super hydrophobic property.

Example 5

Another preferred embodiment comprises a formulation consisting essentially of 0.5 wt % solid of fumed silica (Aerosil R 8200 from Degussa) in solvent comprising from 10-15 wt % acetone and the remainder comprising an aerosol propellent comprising A-70. mineral spirits. The formulation was similar to example 1 except that the example 5 composition was coated on a clear coated painted metal surface by spraying from an aerosol can. The film generated by this formulation showed excellent hydrophobic property (contact angle >165 degree). The super hydrophobic property was maintained for more than 4 weeks.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:
1. A hydrophobic drag reducing coating composition comprising:
   a solvent selected from the group consisting of acetone, an aliphatic hydrocarbon, an alcohol, a hydrocarbon, and mineral spirits;
   a plurality of nanoparticles selected from the group consisting of fumed silica, hydrophobic titania, and zinc oxide; and
   a UV stable hydrophobic perfluoro alkyl substituted acrylic polymer.
2. The hydrophobic drag reducing coating composition of claim 1, further comprising a propellant selected from the group consisting of carbon dioxide, a hydrocarbon, a fluorocarbon, a difloroethane, and compressed air.
3. The hydrophobic drag reducing coating composition of claim 1, wherein said drag reducing coating composition is dispersed in an aerosol.
4. A hydrophobic drag reducing coating composition comprising:
   a solvent selected from the group consisting of acetone, an aliphatic hydrocarbon, an alcohol, and mineral spirits;
   a plurality of nanoparticles selected from the group consisting of fumed silica and hydrophobic titania,
   a plurality of zinc oxide nanoparticles; and
   a hydrophobic polymer selected from the group consisting of an acrylic, a hydroxyl-functional silicone polyacrylate, a polycarboxylate, a polyether, and a polyvinylacetate.
5. The hydrophobic drag reducing coating composition of claim 4 wherein an amount of the zinc oxide nanoparticles is from 0.003 wt. % up to 0.05 wt. %.

\* \* \* \* \*